(12) United States Patent
Yaghi et al.

(10) Patent No.: US 12,508,581 B2
(45) Date of Patent: Dec. 30, 2025

(54) ENZYMES AND METAL-ORGANIC FRAMEWORKS (MOFs)

(71) Applicants: BASF SE, Ludwigshafen am Rhein (DE); THE REGENTS OF THE UNIVERSITY OF CALIFORNIA, Oakland, CA (US)

(72) Inventors: Omar M. Yaghi, Oakland, CA (US); Sonja Kuebelbeck, Ludwigshafen (DE); Grit Baier, Ludwigshafen (DE); Joshua C. Speros, Oakland, CA (US); Zhe Ji, Berkeley, CA (US); Bing Zhang, Berkeley, CA (US); Benjamin Breiten, Ludwigshafen (DE)

(73) Assignees: BASF SE, Ludwigshafen am Rhein (DE); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 491 days.

(21) Appl. No.: 17/759,397

(22) PCT Filed: Jan. 25, 2021

(86) PCT No.: PCT/US2021/014854
§ 371 (c)(1),
(2) Date: Jul. 25, 2022

(87) PCT Pub. No.: WO2021/154629
PCT Pub. Date: Aug. 5, 2021

(65) Prior Publication Data
US 2022/0370993 A1    Nov. 24, 2022

Related U.S. Application Data

(60) Provisional application No. 62/966,335, filed on Jan. 27, 2020.

(51) Int. Cl.
*B01J 31/16* (2006.01)
*B01J 31/00* (2006.01)
(Continued)

(52) U.S. Cl.
CPC ......... *B01J 31/1691* (2013.01); *B01J 31/003* (2013.01); *C11D 3/38681* (2013.01);
(Continued)

(58) Field of Classification Search
None
See application file for complete search history.

(56) References Cited

U.S. PATENT DOCUMENTS

2016/0068784 A1   3/2016   Vinson et al.
2017/0166661 A1   6/2017   Liang et al.
(Continued)

FOREIGN PATENT DOCUMENTS

| CN | 110484527 A | 11/2019 |
| CN | 110484530 A | 11/2019 |
| WO | 2016000032 A1 | 1/2016 |

OTHER PUBLICATIONS

International Preliminary Report on Patentability from corresponding PCT International Application No. PCT/US2021/014854 dated Aug. 11, 2022.
(Continued)

*Primary Examiner* — Yun Qian
(74) *Attorney, Agent, or Firm* — ArentFox Schiff LLP

(57) ABSTRACT

Provided are compositions that include a metal-organic framework (MOF) including a framework defining an internal volume, an enzyme disposed within the internal volume, and a surfactant. Also provided are methods of making the compositions and their use.

14 Claims, 3 Drawing Sheets

MOF precursors        Enzymes

Enzyme ⊂ MOF

(51) Int. Cl.
  *C11D 3/386* (2006.01)
  *C12N 9/20* (2006.01)
  *C12N 9/48* (2006.01)
(52) U.S. Cl.
  CPC .............. *C12N 9/20* (2013.01); *C12N 9/48* (2013.01); *B01J 2531/0216* (2013.01)

(56) References Cited

U.S. PATENT DOCUMENTS

2018/0119053 A1* 5/2018 Kropf .................. C11D 3/168
2019/0211283 A9  7/2019 Kropf et al.

OTHER PUBLICATIONS

First Office Action dated Nov. 18, 2023, of counterpart Chinese Patent Application No. 202180010074.1, along with an English translation.

Li, Peng et al., "Toward Design Rules for Enzyme Immobilization in Hierarchical Mesoporous Metal-Organic Frameworks", *Chem*, vol. 1, No. 1, Jul. 1, 2016, pp. 154-169.

He, Hongming et al., "Construction of Thermophilic Lipase-Embedded Metal-Organic Frameworks via Biomimetic Mineralization: A Biocatalyst for Ester Hydrolysis and Kinetic Resolution", *ACS Applied Materials & Interfaces*, vol. 8, No. 37, Sep. 9, 2016, pp. 24517-24524.

Hongde, An et al., "Incorporation of biomolecules in Metal-Organic Frameworks for advanced applications", *Coordination Chemistry Reviews*, vol. 384, Apr. 1, 2019, pp. 90-106.

Pitzalis, Federica et al., "Lipase Encapsulation onto XIF-8: A Comparison between Biocatalysts Obtained at Low and High Zinc/ 2-Methylimidazole Molar Ratio in Aqueous Medium", *Chemcatchem*, vol. 10, No. 7, Mar. 7, 2018, pp. 1578-1585.

Liang, Weibin et al., "Enhanced Activity of Enzymes Encapsulated in Hydrophilic Metal-Organic Frameworks", *Journal of the American Chemical Society*, vol. 141, No. 6, Jan. 12, 2019, pp. 2348-2355.

Drout, Riki J. et al., "Catalytic applications of enzymes encapsulated in metal-organic frameworks", *Coordination Chemistry Reviews*, vol. 381, Dec. 11, 2018, pp. 151-160.

Nadar, Shamraja S. et al., "Encapsulation of lipase within metal-organic framework (NOF) with enhanced activity intensified under ultrasound", *Enzyme and Microbial Technology*, vol. 108, Aug. 30, 2017, pp. 11-20.

Majewski, Marek B. et al., "Enzyme encapsulation in metal-organic frameworks for applications in catalysis", *Crystengcomm*, vol. 19, No. 29, Jan. 1, 2017, pp. 4082-4091.

International Search Report and Written Opinion from corresponding PCT International Application No. PCT/US2021/014854 dated Apr. 15, 2021.

* cited by examiner

ENZYMES AND METAL-ORGANIC FRAMEWORKS (MOFs)

CROSS REFERENCE TO RELATED APPLICATION

This application claims the benefit of U.S. Provisional Patent Application No. 62/966,335, filed on Jan. 27, 2020, the entire disclosure of which is hereby incorporated by reference for any and all purposes.

FIELD

The present technology is generally related to enzymes and metal-organic frameworks as well as methods of their preparation and use.

BACKGROUND

For an enzyme to be useful, it is necessary for the enzyme to maintain its function and performance. However, many enzyme applications are outside normal possibilities and result in denaturing of the enzyme such that the amino acid residues in the active site are too far apart for their cooperative functions and result in a loss of performance. For example, enzyme denaturing occurs under non-physiological pH values or elevated temperatures conditions as well as in the presence of organic solvents or surfactants. There is a need for technology and methods that enable enzyme stability under incompatible denaturing conditions.

SUMMARY

In one aspect, the present technology provides a composition that includes a framework defining an internal volume, an enzyme disposed within the internal volume, and a surfactant. In any embodiment, the framework defines a pore space. In any embodiment, the enzyme may be a hydrolase (e.g., a peptidase, lipase, and/or glucosidase). In any embodiment, the composition may include more than 0 ppm to about 1500 ppm of the enzyme. In any embodiment, the composition may have a neutral to alkaline pH. In any embodiment, the MOF may include ZIF-8, MOF-74, MIL-53, MAF-7, ZIF-90, or a combination of two or more thereof. In any embodiment, the composition may be a laundry cleaning composition, a dishwashing cleaning composition, a hard-surface cleaning composition, a personal care cleaning composition, or a combination of two or more thereof.

In another aspect, the present technology provides a process for making the composition that includes preparing the composition.

In another aspect, the present technology provides a process for using the composition.

DETAILED DESCRIPTION

Figure 1:
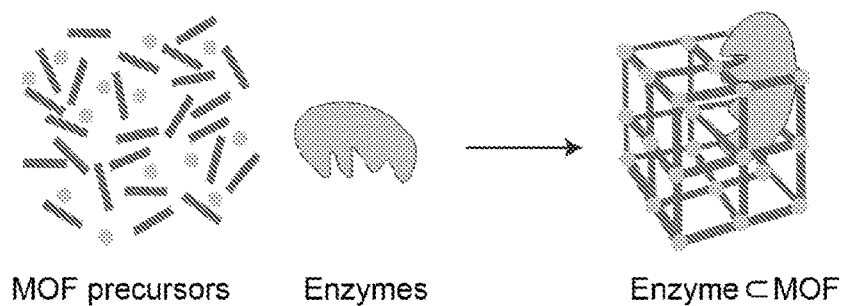
FIG. 1 is a synthetic scheme starting with MOF precursors and an enzyme to produce a MOF including a framework defining an internal volume and the enzyme disposed within the internal volume, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "metal-organic frameworks" or "MOFs" refer to a class of compounds having metal ions or clusters coordinated to organic ligands to form three-dimensional structures. MOFs are a subclass of coordination polymers, with the special feature that they are often porous with an internal volume.

As used herein, "ZIF-8" will be understood by persons of ordinary skill in the art as referring to metal-organic frameworks derived from 2-methylimidazole and a metal salt. For example, ZIF-8 is described in Lee et al., Chem. Eng. J. 2015, 271, 272-280, which is herein incorporated by reference.

As used herein, "MOF-74" will be understood by persons of ordinary skill in the art as referring to metal-organic frameworks derived from 2,5-dihydroxyterephthalic acid and a metal salt. For example, MOF-74 is described in Rosi et al., J. Am. Chem. Soc., 2005, 127, 1504-1518, which is herein incorporated by reference.

As used herein, "MIL-53" will be understood by persons of ordinary skill in the art as referring to a metal-organic frameworks derived from terephthalic acid and a metal salt. For example, MIL-53 is described in Pu et al., Appl. Catal., A, 2018, 549, 82-92 and Loiseau et al., Chem. Eur. J. 2004, 10(6), 1373-1382, which are herein incorporated by reference.

As used herein, "MAF-7" will be understood by persons of ordinary skill in the art as referring to a metal-organic frameworks derived from 3-methyl-1,2-4-triazole and a metal salt. For example, MAF-7 is as described in Zhang et al., Adv. Mater. 2011, 23, 126-1271, which is herein incorporated by reference.

As used herein, "ZIF-90" will be understood by persons of ordinary skill in the art as referring to a metal-organic frameworks derived from imidazolate-2-carboxyaldehyde and a metal salt. For example, ZIF-90 is described in Morris et al., J. Am. Chem. Soc. 2008, 130, 12626-12627, which is herein incorporated by reference.

ZIF-8, MOF-74, MIL-53, MAF-7, and ZIF-90 are also described in Yaghi et al., Introduction to Reticular Chemistry: Metal-Organic Frameworks and Covalent Organic Frameworks; Wiley-VCH: Weinheim, 2019, which is herein incorporated by reference.

As used herein, "disposed" refers to the enzyme being unable to freely move outside the internal volume. The term "disposed" may be readily interchanged with the terms "encapsulated," "entrapped," or "embedded." In any embodiment, at least part of the enzyme is disposed within the internal volume. In any embodiment, at least about 50%, at least about 75%, at least about 80%, at least about 85%, at least about 90%, at least about 95%, or at least about 99% of the enzyme is disposed within the internal volume. In any embodiment, the MOF may contribute to the enzyme maintaining its quaternary and/or tertiary structure. In any embodiment, the MOF may contribute to the enzyme maintaining its function and performance.

In one aspect, the present technology provides a composition that includes a MOF including a framework defining an internal volume, an enzyme disposed within the internal volume, and a surfactant. In any embodiment, the MOF is constructed from precursors that include an organic compound and metal salt that react to form the framework. Commonly, the MOF is crystalline. In the present technology, MOFs are formed in the presence of an enzyme such that formation of the framework disposes the enzyme within the internal volume as exemplified in FIG. 1. In any embodiment, the enzyme and the MOF are not covalently bonded.

Figure 2:
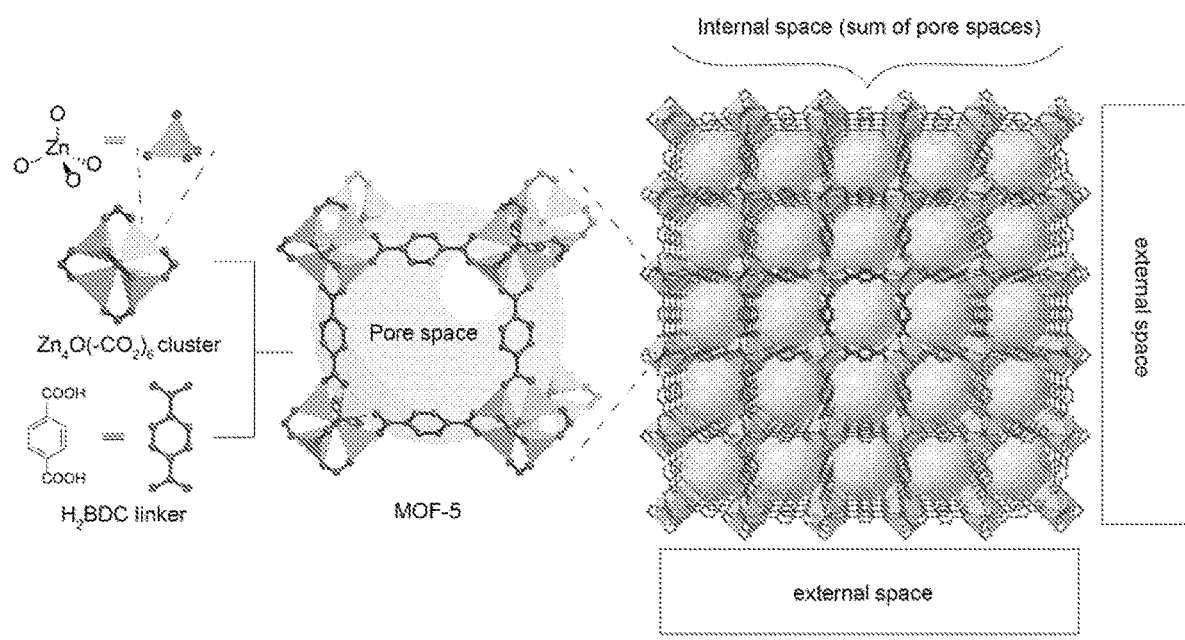
FIG. 2 is a schematic depiction of a MOF without disposed enzyme having pore space (i.e., space within the framework plane) and external space (i.e., space outside the MOF), according to the examples.

The internal volume is defined by the framework. For example, as depicted in FIG. 2 the framework has an internal volume (i.e., space within the framework). In any embodiment, the MOF includes planes defined by the framework. In any embodiment, the plane divides the internal volume from an external space around the MOF, where the plane is defined by the vertices and edges of the framework. In any embodiment, the internal volume is surrounded by the framework and the planes defined by the framework. In any embodiment, the framework defines pore spaces within the plane. The pores allow passage of components into and out of the internal volume of the MOF. In any embodiment, the pores have a size that does not allow the enzyme to escape the internal volume. In any embodiment, the pores may be of a size that allow compounds having a molecular weight less than the enzyme to enter the internal volume from the external space. In any embodiment, the pores may be of a size that allow compounds having a molecular weight less than the enzyme to exit the internal volume and enter the external space. In any embodiment, the compounds may have a molecular weight at least about 25% less than the enzyme, at least about 30% less than the enzyme, at least about 40% less than the enzyme, at least about 50% less than the enzyme, at least about 60% less than the enzyme, at least about 70% less than the enzyme, at least about 75% less than the enzyme, at least about 80% less than the enzyme, at least about 85% less than the enzyme, at least about 90% less than the enzyme, or at least about 95% less than the enzyme. In any embodiment, the pores may be of a size that prevent compounds having a molecular weight equal to or greater than the enzyme from entering the internal volume from the external space. In any embodiment, the pores may be of a size that prevent compounds having a molecular weight at least 75% of the enzyme molecular weight from entering the internal volume from the external space. In any embodiment, the pores may be of a size that prevent an enzyme (e.g., protease) from entering the internal volume from the external space. In any embodiment, the pores may be of a size that prevent other large molecules such as polymers (e.g, poly(acrylic acid), poly(ethylenimine), poly(vinyl alcohol), poly(ethylene glycol), poly(propylene glycol), poly (vinylpyrrolidone), poly(saccharide), and copolymers thereof and combinations of two or more thereof) from entering the internal volume from the external space.

In any embodiment, the enzyme may be a hydrolase. Non-limiting examples of the enzyme include a peptidase, lipase, glucosidase, or a combination of two or more thereof. In any embodiment, the composition may include more than 0 ppm to about 1500 ppm of the enzyme. In any embodiment, the composition may include about 40 ppm to about 900 ppm of the enzyme. In any embodiment, the composition may include about 40 ppm to about 200 ppm of the enzyme. In any embodiment, the composition may include about 40 ppm to about 100 ppm of the enzyme. In any embodiment, the composition may include about 500 ppm to about 900 ppm of the enzyme. In any embodiment, the composition may include about 700 ppm to about 900 ppm of the enzyme. In any embodiment, the composition may include about 800 ppm to about 900 ppm of the enzyme. In any embodiment, the composition may include about 300 ppm to about 600 ppm of the enzyme. In any embodiment, the composition may include about 400 ppm to about 500 ppm of the enzyme. In any embodiment, the composition may include about 40 ppm to about 200 ppm, about 40 ppm to about 100 ppm, or about 40 ppm to about 70 ppm of the lipase enzyme. In any embodiment, the composition may include about 500 ppm to about 900 ppm, about 700 ppm to about 900 ppm, or about 800 ppm to about 900 ppm of the peptidase enzyme. In any embodiment, the composition may include about 50 ppm to about 500 ppm, about 100 ppm to about 250 ppm, or about 150 ppm to about 250 ppm of the glucosidase enzyme.

In any embodiment, the MOF includes reacted MOF precursors. In any embodiment, the MOF precursors include an organic compound and a metal salt.

In any embodiment, the organic compound includes a compound having an imidazole group, a triazole group, at least two carboxylic acid groups, or a combination of two or more thereof. In any embodiment, the organic compound includes 2-methylimidazole, 3-methyl-1,2-4-triazole, terephthalic acid optionally substituted with one or more hydroxyl groups or more amino groups, or a combination thereof. In any embodiment, the organic compound may include 2-methylimidazole, imidazolate-2-carboxyaldehyde, or a combination thereof. In any embodiment, the organic compound may include terephthalic acid, 2,5-dihydroxyterephthalic acid, or a combination thereof In any embodiment, the organic compound may include 3-methyl-1,2-4-triazole.

In any embodiment, the metal salt may include Zn, Al, Co, Fe, Sc, Ca, Mg, Mn, Li, Ni, Cu, Zr, or a combination of two or more thereof In any embodiment, the metal salt may include Zn, Al, Fe, Mg, or a combination of two or more thereof. In any embodiment, the metal salt may include Zn, Al, or a combination thereof. In any embodiment, the metal salt may include $Zn(NO_3)_2$, $Zn(OAc)_2$, $Al(NO)_3$, or any other metal salt known by persons of ordinary skill in the art for synthesis of MOFs. In any embodiment, the metal salt may include a trivalent and/or divalent metal. In any embodiment, the metal salt may include a trivalent metal. In any embodiment, the metal salt may include a trivalent aluminum.

In any embodiment, the MOF may include ZIF-8, MOF-74, MIL-53, MAF-7, ZIF-90, or a combination of two or more thereof.

In any embodiment, the surfactant may include a nonionic surfactant, an anionic surfactant, a cationic surfactant, a zwitterionic surfactant, or a combination of two or more thereof.

In any embodiment, the surfactant may include a nonionic surfactant. A nonionic surfactant may include alkyl alkoxylated alcohols (e.g., $C_8$-$C_{18}$ alkyl alkoxylated alcohol having an average degree of alkoxylation of from 1 to 50), alcohol ethoxylates (AE or AEO), alcohol propoxylates, propoxylated fatty alcohols (PFA), alkoxylated fatty acid alkyl esters (e.g., ethoxylated and/or propoxylated fatty acid alkyl esters), alkylphenol ethoxylates (APE), nonylphenol ethoxylates (NPE), alkylpolyglycosides (APG), alkoxylated amines, fatty acid monoethanolamides (FAM), fatty acid diethanolamides (FADA), ethoxylated fatty acid monoethanolamides (EFAM), propoxylated fatty acid monoethanolamides (PFAM), polyhydroxyalkyl fatty acid amides, N-acyl N-alkyl derivatives of glucosamine (e.g., glucamides, GA, or fatty acid glucamides, FAGA), products available under the trade names SPAN and TWEEN, or combinations of two or more thereof.

In any embodiment, the surfactant may include an anionic surfactant. An anionic surfactant may include a sulfate, sulfonate, or a combination thereof. In any embodiment, the sulfonate may include alkane-2,3-diylbis(sulfate), alkyl sulfate (AS), or a combination thereof. In any embodiment, AS includes, but is not limited to, sodium dodecyl sulfate (SDS), fatty alcohol sulfate (FAS), primary alcohol sulfate (PAS), alcohol ethersulfates (AES, also known as alcohol ethoxysulfates or fatty alcohol ether sulfates), or combinations of two or more thereof. In any embodiment, the sulfate includes an alcohol ethersulfate (AES). In any embodiment, the sulfonate may include a linear alkylbenzenesulfonate (LAS), isomer of LAS, branched alkylbenzenesulfonate (BABS), phenylalkanesulfonate, alpha-olefinsulfonate (AOS), olefin sulfonate, alkene sulfonate, hydroxyalkanesulfonate and disulfonate, secondary alkanesulfonate (SAS), paraffin sulfonate (PS), ester sulfonate, sulfonated fatty acid glycerol ester, a-sulfo fatty acid methyl ester ($\alpha$-SFMe or SES includes methyl ester sulfonate (IVIES)), alkyl- or alkenylsuccinic acid, dodecenyl/tetradecenyl succinic acid (DTSA), fatty acid derivatives of amino acids, diesters and monoesters of sulfo-succinic acid or soap, or a combination of two or more thereof. In any embodiment, the sulfonate may include an alkylbenzenesulfonate (LAS).

In any embodiment, the surfactant may include a cationic surfactant. A cationic surfactant may include an alkyl pyridinium compounds, an alkyl quaternary ammonium compounds, an alkyl quaternary phosphonium compounds, an alkyl ternary sulphonium compounds, or a combination of two or more thereof. In any embodiment, the an alkyl quaternary ammonium compounds may have the general formula: $(R)(R_1)(R_2)(R_3)N^+ X^-$, wherein R is a linear or branched, substituted or unsubstituted $C_6$-$C_{18}$ alkyl or alkenyl moiety, $R_1$ and $R_2$ are independently selected from methyl or ethyl moieties, $R_3$ is a hydroxyl, hydroxymethyl, or a hydroxyethyl moiety, X is an anion which provides charge neutrality, suitable anions include: halides, e.g. chloride; sulphate; and sulphonate. In any embodiment, the cationic surfactant may include a mono-$C_6$-$C_{18}$ alkyl mono-hydroxyethyl di-methyl quaternary ammonium chloride. In any embodiment, the cationic surfactant may include a mono-$C_8$-$C_{10}$ alkyl mono-hydroxyethyl di-methyl quaternary ammonium chloride, mono-$C_{10}$-$C_{12}$ alkyl mono-hydroxyethyl di-methyl quaternary ammonium chloride and mono-$C_{10}$ alkyl mono-hydroxyethyl di-methyl quaternary ammonium chloride. Non-limiting examples of cationic surfactants include alkyldimethylethanolamine quat (AD-MEAQ), cetyltrimethylammonium bromide (CTAB), dimethyldistearylammonium chloride (DSDMAC), and alkylbenzyldimethylammonium, alkyl quaternary ammonium compounds, alkoxylated quaternary ammonium (AQA) compounds, ester quats (quaternary ammoniums), and combinations of two or more thereof.

In any embodiment, the surfactant may include a zwitterionic surfactant. A zwitterionic surfactant may include an amine oxide, betaine (e.g., alkyldimethylbetaine and sulfobetaine), or a combination of two or more thereof.

In any embodiment, the composition may include about 10 wt % to about 98 wt % of the surfactant. In any embodiment, the composition may include about 50 wt % to about 98 wt % of the surfactant. In any embodiment, the composition may include about 70 wt % to about 98 wt % of the surfactant. In any embodiment, the composition may include about 10 wt % to about 40 wt % of the surfactant. In any embodiment, the composition may include about 20 wt % to about 30 wt % of the surfactant. In any embodiment, the composition may include about 12 wt % to about 30 wt % of the surfactant. In any embodiment, the composition may include about 15 wt % to about 25 wt % of the surfactant. In any embodiment, the composition may include about 20 wt % to about 40 wt % of the surfactant. In any embodiment, the composition may include about 25 wt % to about 35 wt % of the surfactant.

In any embodiment, the composition may have a neutral to alkaline pH (e.g., pH of about 7 or above). In any embodiment, the composition may have a pH of about 7 to about 11. In any embodiment, the composition may have a pH of about 7 to about 10. In any embodiment, the composition may have a pH of about 7 to about 9. In any embodiment, the composition may have a pH of about 7 to about 8.

In any embodiment, the composition may be formulated as a regular, compact or concentrated liquid; a gel; a paste; a soap bar; a regular or a compacted powder; a granulated solid; a homogenous or a multilayer tablet with two or more layers (same or different phases); a pouch having one or more compartments; a single or a multi-compartment unit dose form; or a combination of two or more thereof In any embodiment, the composition may be in a solid form. Commonly, the solid form may include less than about 10 wt % solvent (e.g., less than about 5 wt %, less than about 2 wt %, less than about 1 wt %, or less than about 0.5 wt %). In any embodiment, the composition may be in a semi-solid (e.g., gel and/or paste) or liquid form. Commonly, the semi-solid or liquid form may include a solvent. In any embodiment, the composition may be a concentrated semi-solid composition or concentrated liquid composition.

In any embodiment, the solvent may include an organic solvent, water, or a combination thereof. Organic solvents include, but are not limited to, C1-C6 alcohols such as propanol, ethanol, isopropanol, ethylene glycol, propylene glycol, hexylene glycol, and/or butylene glycol. In any embodiment, the solvent may include water. In any embodiment, the composition may include at least about 10 wt %, at least about 20 wt %, at least about 30 wt %, at least about 40 wt %, at least about 50 wt %, or at least about 60 wt % of the solvent. In any embodiment, the composition may include about 15 wt % to about 75 wt % of the solvent, about 15 wt % to about 70 wt % of the solvent, about 15 wt % to about 60 wt % of the solvent, or about 15 wt % to about 50 wt % of the solvent. In any embodiment, the composition may include about 50 wt % to about 95 wt % of the solvent, about 60 wt % to about 90 wt % of the solvent, about 60 wt % to about 80 wt % of the solvent, or about 60 wt % to about 70 wt % of the solvent.

In any embodiment, the composition may be a laundry cleaning composition, a dishwashing cleaning composition, a hard-surface cleaning composition, a personal care cleaning composition, or a combination of two or more thereof. In any embodiment, the composition may further include one or more components commonly present in dishwashing cleaning, a hard-surface cleaning, and/or a personal care cleaning compositions. For example, the composition may further include an optical brightener, a polyacrylate, an organic polycarboxylic acid, a chelator, an electrolyte, dye, fragrance, anti-redeposition agent, preservative, processing aid, fillers, bleaches and the like that are commonly included in detergent compositions.

In any embodiment, the enzyme exhibits a residual activity of at least 90% for at least 28 days of storage at elevated temperatures. In any embodiment, the elevated temperature may be from about 30° C. to about 65° C., about 30° C. to about 55° C., or about 30° C. to about 45° C.

In another aspect, the present technology provides a process for producing the MOF. In any embodiment, the process may occur via a co-precipitation process. In any embodiment, the co-precipitation comprises precipitation in water. In any embodiment, the MOF precursors provided herein may be added to an aqueous composition containing the enzyme to provide an aqueous mixture. In any embodiment, the addition of the MOF precursors may be added under continuous stirring. In any embodiment, the addition of the MOF precursors may be added sequentially. In any embodiment, the aqueous mixture may be stirred for about 2 h to about 48 h (e.g., about 5 h to about 36 h or about 20 h to about 28 h). In any embodiment, following stirring the aqueous mixture may be centrifuged.

In another aspect, the present technology provides a process for producing the composition provided herein. In any embodiment, the MOF with disposed enzyme may be added to a container comprising the surfactant.

In another aspect, the present technology provides a method for using the composition provided herein. In any embodiment, the composition may be used following any conventional method for using a laundry cleaning composition, a dishwashing cleaning composition, a hard-surface cleaning composition, and/or a personal care cleaning composition, The present invention, thus generally described, will be understood more readily by reference to the following examples, which are provided by way of illustration and are not intended to be limiting of the present invention.

EXAMPLES

Lipase was purchased from Sigma-Aldrich (L0777) and diluted with water to provide a lipase stock solution with an enzyme concentration of 5 mg/mL.

A BCA assay was used to calculate the encapsulation efficiency by measuring the enzyme content in the supernatant. Specifically, enzyme that was encapsulated in the MOF was determined as the difference between the starting enzyme amount and the amount in the supernatant.

Example 1

ZIF-8 With Encapsulated Lipase

The lipase stock solution was added to a vessel containing water under continuous stirring followed by addition of 2-methylimidazole (2 M) and zinc acetate dehydrate (0.4 M). The solution had a final concentration of 0.25 and 0.125 mg/mL lipase, 25-800 mM 2-methylimidazole, and 0.625-30 mM zinc acetate dihydrate. Stirring was continued for another 24 hours at room temperature. The solution was centrifuged for five minutes at 6700×g followed by removal of the supernatant. The supernatant was used for the BCA assay. Redispersed pellet was washed three times with water, before the enzyme activity was determined for pellet and supernatant using a lipase specific assay. The activity of encapsulated lipase was 49%.

Example 2

MOF-74 With Encapsulated Lipase

The lipase stock solution was added to a vessel containing water under continuous stirring followed by addition of 2,5-dihydroxyterephthalic acid (0.3 M) and zinc acetate dehydrate (0.4 M). The solution had a final concentration of 0.25 and 0.125 mg/mL lipase, 3-25 mM 2,5-dihydroxyterephthalic acid, and 7-58.6 mM zinc acetate dehydrate. Stirring was continued for another 24 hours at room temperature. The solution was centrifuged for five minutes at 6700×g followed by removal of the supernatant. The supernatant was used for the BCA assay. Redispersed pellet was washed three times with water, before the enzyme activity was determined for pellet and supernatant using a lipase specific assay. The activity of encapsulated lipase was 33%.

Example 3

MIL-53 With Encapsulated Lipase

The lipase stock solution was added to a vessel containing water under continuous stirring followed by addition of terephthalic acid (0.1 M) and aluminum nitrate nonahydrate (1.3 M). The solution had a final concentration of 0.25 and 0.125 mg/mL lipase, 9-44 mM terephthalic acid, and 17-67 mM aluminum nitrate nonahydrate. Stirring was continued for another 24 hours at room temperature. The solution was centrifuged for five minutes at 6700×g followed by removal of the supernatant. The supernatant was used for the BCA assay. Redispersed pellet was washed three times with water, before the enzyme activity was determined for pellet and supernatant using a lipase specific assay. The activity of encapsulated lipase was 75%.

Example 4

Storage Tests

Test 1: With Surfactant
Water-based test solutions containing protease and (A) lipase (non-encapsulated/pure lipase), (B) Example 1, (C)

Example 2, and (D) Example 3 were prepared. Each test solution was divide in half. To one half of the test solutions a surfactant mixture was added. Measurement of lipase activity began upon addition of the surfactant mixture. Activity was additionally measured at 4 h, 1 day, 2 days, 7 days, 14 days, 21 days, and 28 days. All solutions had a final concentration of 0.05 mg/mL lipase, 0.9 mg/mL protease, and 20% surfactant (if present) and were maintained at a temperature of 22° C. or 37° C.

Figure 3:
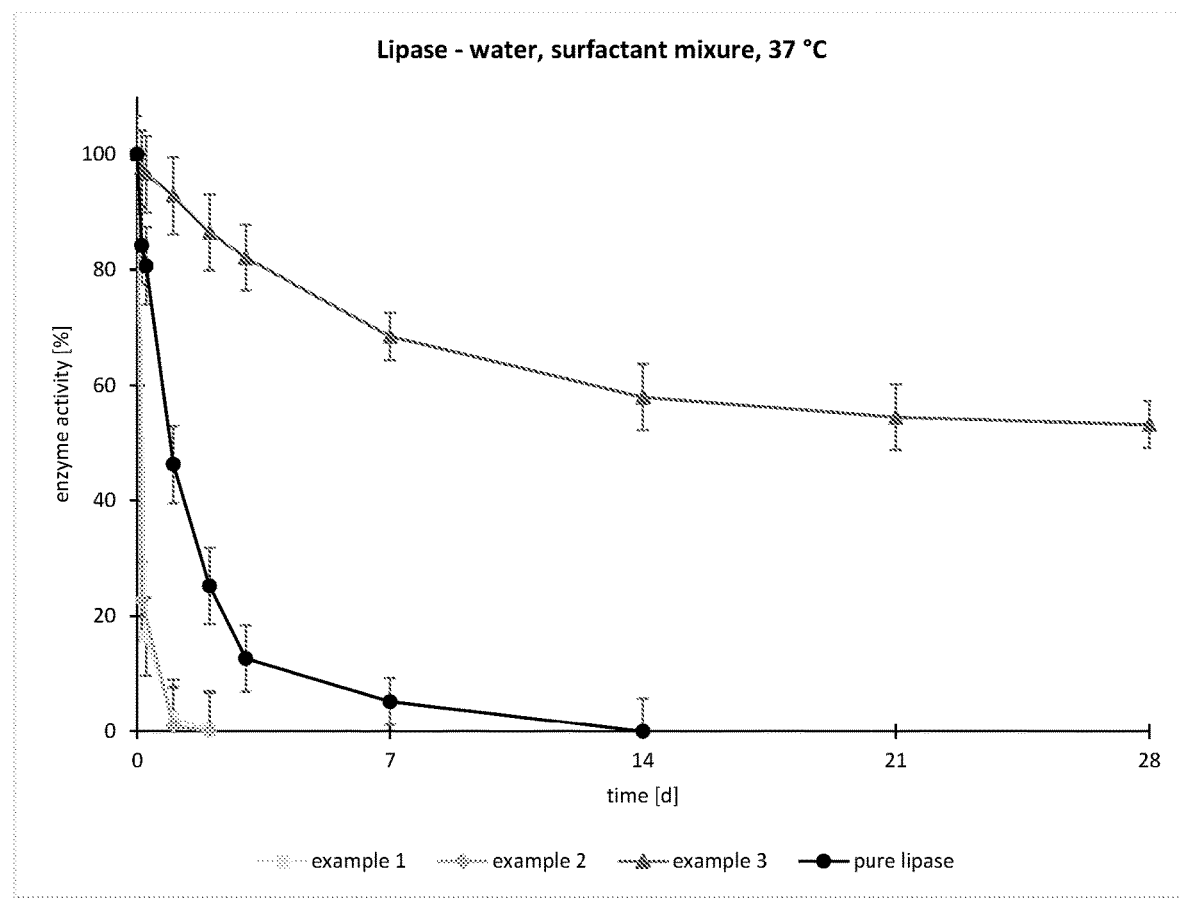
FIG. 3 is a chart illustrating enzyme activity in the presence of a surfactant mixture under storage at 37° C. in water, according to the examples.

FIG. 3 illustrates that lipase activity for non-encapsulated/pure lipase reduced over the 28 day period at 37° C. in water. By day 14, the non-encapsulated lipase activity was zero. In contrast, the MOF of Example 3 maintained at least about 60% lipase activity over the 28 day period at 37° C. in water. Not wishing to be bound by theory, it is believed the MOF of Example 3 provides enhanced stability due to the trivalent aluminum in a high ion strength composition such as in the surfactant mixture. Comparably, the MOFs of Examples 1 and 2 include bivalent zinc which represents a challenge for MOFs and may be leading to their deconstruction. In a low ion strength composition such as an aqueous solution, the bivalent MOFs are stable and can protect lipase against degradation by protease.

Test 2: Without Surfactant

Water-based solutions containing protease and (A) lipase (non-encapsulated/pure lipase), (B) Example 1, (C) Example 2, and (D) Example 3 were prepared. All solutions had a concentration of 0.05 mg/mL lipase and 0.9 mg/mL protease and were maintained at a temperature of 22° C. Measurement of lipase activity began upon addition of the protease to the lipase solution. Activity was additionally measured at 4 h, 1 day, 2 days, 7 days, 14 days, 21 days, and 28 days.

Figure 4:
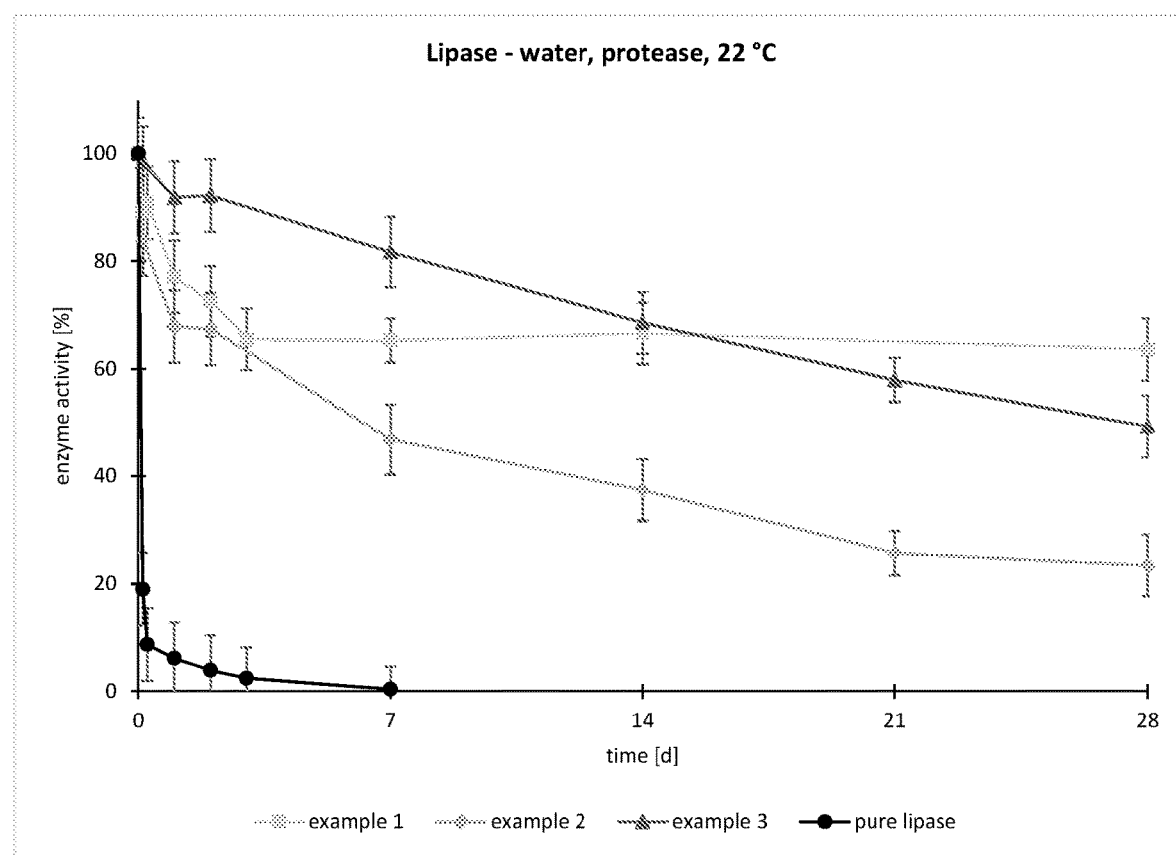
FIG. 4 is a chart illustrating enzyme activity in presence of protease under storage at 22° C. in water, accordingly to the examples.

FIG. 4 illustrates that lipase activity for non-encapsulated lipase quickly decreased over the 28 day period at 22° C. in water. By day 7, the non-encapsulated lipase inactive. In contrast, at least 20% lipase activity was maintained when the lipase was encapsulated in a MOF (i.e., Examples 1, 2, and 3) over the 28 day period at 22° C. in water. By day 7, the MOF encapsulated lipase activity was about 50% (Example 2) to about 90% (Example 3). Not wishing to be bound by theory, it is believed the non-encapsulated lipase became inactive due to proteolytic degradation by the protease and the MOF prevents the protease from accessing the lipase.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A composition comprising:
    a metal-organic framework (MOF) comprising a framework defining an internal volume;
    an enzyme disposed within the internal volume; and
    a surfactant,
    wherein the enzyme comprises a peptidase, lipase, glucosidase, or a combination of two or more thereof;
    wherein the MOF comprises MIL-53;
    wherein the composition comprises about 10 wt % to about 40 wt % of the surfactant;
    wherein the composition comprises about 40 ppm to 900 ppm of the enzyme; and
    wherein the composition has a neutral to alkaline pH.

2. The composition of claim 1, wherein the surfactant comprises a nonionic surfactant, an anionic surfactant, a cationic surfactant, a zwitterionic surfactant, or a combination of two or more thereof.

3. The composition of claim 2, wherein the nonionic surfactant comprises alkyl alkoxylated alcohols, alcohol ethoxylates, alcohol propoxylates, propoxylated fatty alcohols, alkoxylated fatty acid alkyl esters, alkylphenol ethoxylates, nonylphenol ethoxylates, alkylpolyglycosides, alkoxylated amines, fatty acid monoethanolamides, fatty acid diethanolamides, ethoxylated fatty acid monoethanolamides, propoxylated fatty acid monoethanolamides, polyhydroxyalkyl fatty acid amides, N-acyl N-alkyl derivatives of glucosamine, or combinations of two or more thereof.

4. The composition of claim 2, wherein the anionic surfactant comprises a sulfate, sulfonate, or a combination thereof.

5. The composition of claim 4, wherein the sulfonate comprises alkane-2,3-diylbis (sulfate), alkyl sulfate, or a combination thereof.

6. The composition of claim 4, wherein the sulfonate comprises a linear alkylbenzenesulfonate, isomer of alkylbenzenesulfonate, branched alkylbenzenesulfonate, phenylalkanesulfonate, alpha-olefinsulfonate, olefin sulfonate, alkene sulfonate, hydroxyalkanesulfonate and disulfonate, secondary alkanesulfonate, paraffin sulfonate, ester sulfonate, sulfonated fatty acid glycerol ester, α-sulfo fatty acid methyl ester, alkyl-or alkenylsuccinic acid, dodecenyl/tetradecenyl succinic acid, fatty acid derivatives of amino acids, diesters and monoesters of sulfo-succinic acid or soap, or a combination of two or more thereof.

7. The composition of claim 2, wherein the cationic surfactant comprises an alkyl pyridinium compounds, an alkyl quaternary ammonium compounds, an alkyl quaternary phosphonium compounds, an alkyl ternary sulphonium compounds, or a combination of two or more thereof.

8. The composition of claim 2, wherein the zwitterionic surfactant comprises an amine oxide, betaine, or a combination of two or more thereof.

9. The composition of claim 1, wherein the enzyme and the MOF are not covalently bonded.

10. The composition of claim 1, wherein the framework defines a pore space.

11. The composition of claim 1, wherein the MOF comprises reacted MOF precursors.

12. The composition of claim 11, wherein the MOF precursors comprise an organic compound and a metal salt.

13. The composition of claim 12, wherein the organic compound comprises a compound having an imidazole group, a triazole group, or at least two carboxylic acid groups.

14. The composition of claim 12, wherein the metal salt comprises Zn, Al, Co, Fe, Sc, Ca, Mg, Mn, Li, Ni, Cu, Zr, or a combination of two or more thereof.

* * * * *